UNITED STATES PATENT OFFICE.

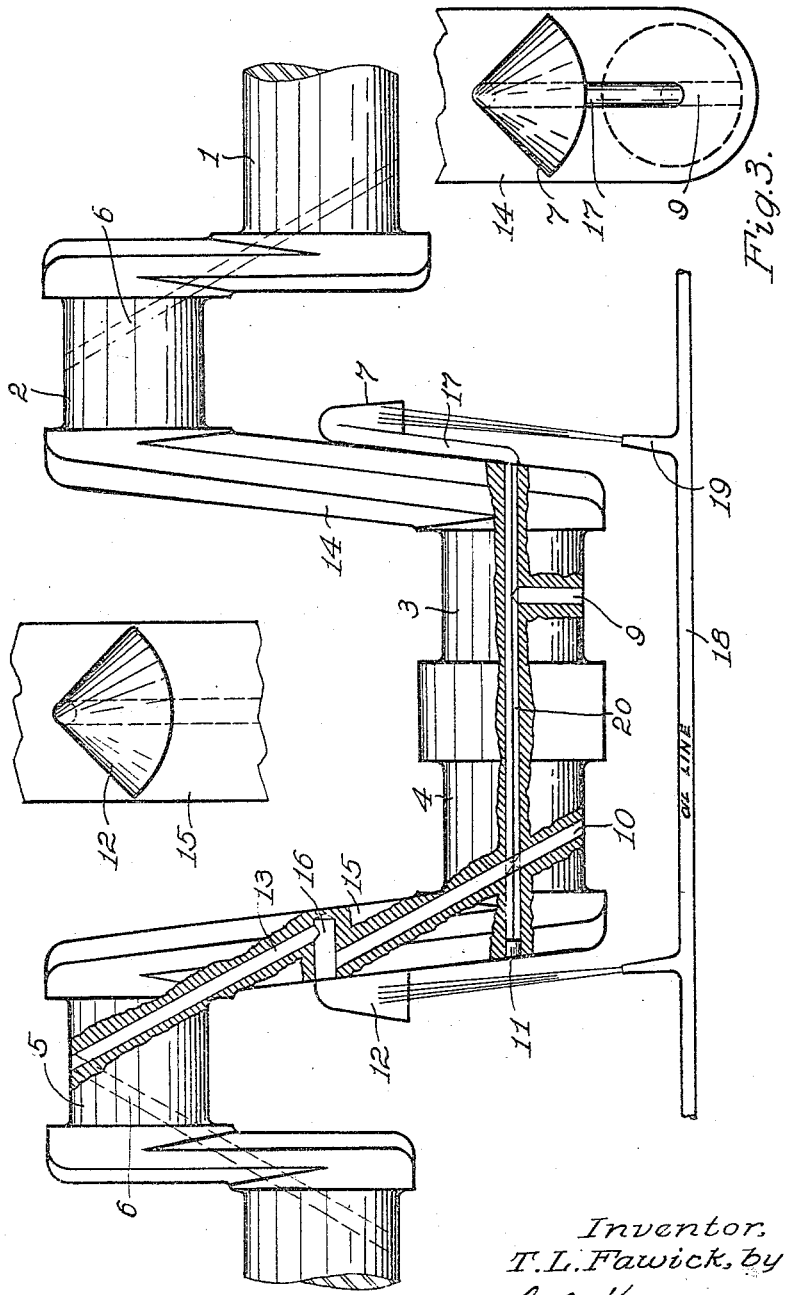

THOMAS L. FAWICK, OF WATERLOO, IOWA.

LUBRICATING MEANS FOR CRANK-SHAFTS.

1,267,526.   Specification of Letters Patent.   Patented May 28, 1918.

Application filed January 30, 1917. Serial No. 145,553.

*To all whom it may concern:*

Be it known that I, THOMAS L. FAWICK, a citizen of the United States of America, and a resident of Waterloo, Blackhawk county, Iowa, have invented certain new and useful Improvements in Lubricating Means for Crank-Shafts, of which the following is a specification.

My invention relates to improvements in lubricating means for crank shafts, and the object of my improvement is to combine outside pressure with suction caused through the centrifugal force developed by rotation of a crank, to efficiently move the fluid lubricant to lubricate a bearing for a pitman on the crank.

This object I have accomplished by the means which are hereinafter described and claimed, and which are illustrated in the accompanying drawings, in which Figure 1 is an elevation of a portion of the crank-shaft comprising the cranks thereon, and provided with my improved lubricating means, parts being broken away to disclose the passages for the lubricant; Fig. 2 is an end elevation of a portion of one of said cranks, showing a lubricant receiving cone mounted thereon in communication with a passage for lubricant; Fig. 3 is a similar view, showing a modified form of cone or lubricant receiving device mounted on a crank for a like purpose.

Similar numerals of reference denote corresponding parts throughout the several views.

The crank-shaft 1 is supplied with cranks 14 and 15 arranged to supply pitman-bearings 2 and 5 on one side of the shaft, and 3 and 4 on the opposite side. The crank pins 2 and 5 may be lubricated through the passages 6 which extend obliquely through the shaft 1 and through said pins to the outer surfaces thereof.

I have provided the following means for lubricating the other crank-pins 3 and 4:

A central longitudinal passage 20 is formed through the crank-pins 3 and 4 and the supporting parts of the cranks 14 and 15, and has one end plugged at 11. A hollow cone 7 is positioned against the crank 14 to open outwardly or radially away from the axis of the shaft 1, and has a reversely directed hollow stem 17 which communicates with the opposite end of the passage 20, the passage 9 communicating between the passage 20 and the outer surface of the crank-pin 3. A receiving cone 12 is mounted on the opposite crank 15 to communicate directly with the passage 16 in said crank, closed at its inner end but communicating with the outer surface of the crank-pin 4 by means of an inclined passage 10. Another inclined passage 13 may be furnished as shown to communicate between the passage 15 and the outer surface of the crank-pin 5, if desired, and in that case, an independent lubricating passage 6 may be omitted.

The numeral 18 denotes a pipe line in communication with a source of fluid lubricant under pressure, and supplied with nipples 19 properly positioned to deliver jets of the lubricant into said receiving cones 7 and 12 at such a time during the revolution of the cranks 14—15 as the openings of said cones pass through said jets.

Since the fluid lubricant is driven into said cones under a considerable head, it is forced thereby into the passages above described to find an outlet to the crank-pin bearings. This pressure derived from outside means should be sufficient ordinarily to force the lubricant to the bearing surfaces, but it should be noted considerable centrifugal force arises from the rapid rotation of the cranks which causes a suction to develop in the lubricant carrying passages, and this combines with said outside pressure in transporting the lubricant efficiently to said bearings at all times.

Said lubricating means is therefore applicable for the lubrication of crank-pin bearings where the lubricant cannot be driven directly into the passage formed in the crank-shaft, such as is indicated in dotted lines 6 in said Fig. 1.

I wish it to be understood, furthermore, that my invention will properly cover various modifications of the means herein shown.

Having described my invention, what I claim as new, and desire to secure by Letters Patent, is:

1. Means for lubricating a crank-pin bearing, comprising crank-shaft having a crank and crank-pin provided with a passage leading to the crank-pin bearing from an opening in line with the axis of the crank-shaft, a cup opening away from the opening of said passage, and means for delivering a jet of fluid lubricant under pressure into said cup and passage.

2. Means for lubricating crank-pin bearings, comprising a crank-shaft with cranks having crank-pins with communicating passages therein leading from a receiving port in a crank in line with the axis of the crank-shaft to the bearings of the crank-pins, a cupped receptacle in communication with said port, and means for delivering a jet of fluid lubricant into said receptacle.

3. A rotatable shaft having a crank provided with a crank-pin, and a crank extending from said crank-pin across the axis of the shaft and having beyond said axis a crank-pin, the latter crank having an axially located inlet-port for lubricant, and having a passage leading from said inlet-port to an outlet-port in a crank-pin.

Signed at Waterloo, Iowa, this 27th day of Jan., 1917.

THOMAS L. FAWICK.

Copies of this patent may be obtained for five cents each, by addressing the "Commissioner of Patents, Washington, D. C."